Figure 1:
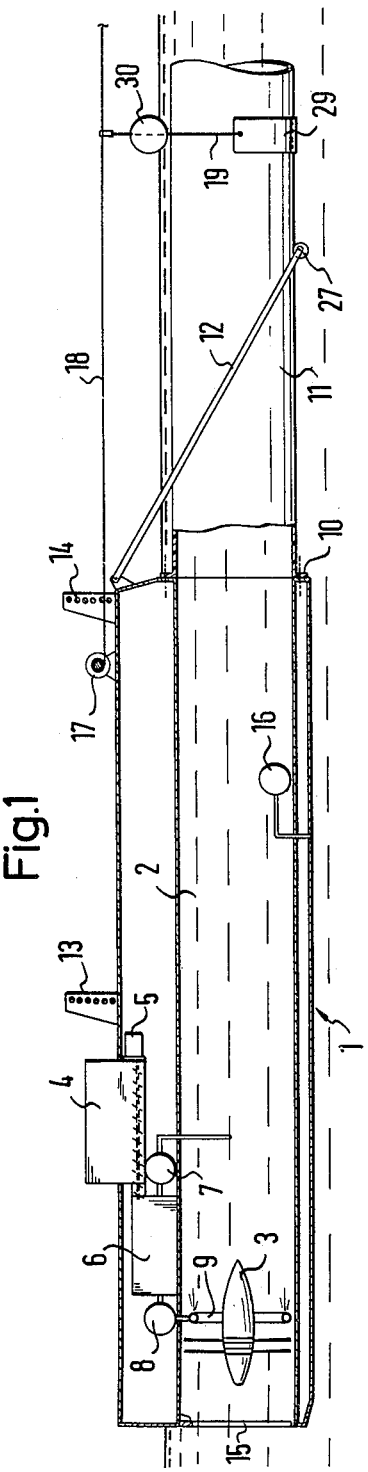

United States Patent [19]
Rafael

[11] 3,988,241
[45] Oct. 26, 1976

[54] FLOATING DEVICE FOR REMOVING REFUSE SITUATED ON AND UNDER A WATER SURFACE

[76] Inventor: Johann Rafael, Maxstrasse 36, Salzburg, Austria

[22] Filed: Mar. 17, 1975

[21] Appl. No.: 558,882

Related U.S. Application Data

[63] Continuation of Ser. No. 404,908, Oct. 10, 1973, abandoned.

[30] Foreign Application Priority Data

Oct. 11, 1972 Germany............................ 2249898

[52] U.S. Cl............................... 210/208; 210/242 R
[51] Int. Cl.²................... B01D 21/00; E02B 15/04
[58] Field of Search.......... 210/170, 198, 208, 219, 210/292, 521; 61/1 F

[56] References Cited
UNITED STATES PATENTS

| | | | |
|---|---|---|---|
| 3,563,036 | 3/1971 | Smith et al. ............................ | 61/1 F |
| 3,595,396 | 7/1971 | Mackrie................................. | 210/208 |
| 3,598,239 | 8/1971 | Mackrie............................... | 210/208 |
| 3,618,773 | 11/1971 | Jacquet................................ | 210/242 |
| 3,655,051 | 4/1972 | Quase .................................. | 210/170 |
| 3,674,687 | 7/1972 | Quase .................................. | 210/170 |
| 3,701,428 | 10/1972 | Lesh .................................... | 210/170 |
| 3,779,910 | 12/1973 | Chatfield ............................ | 210/208 |
| 3,782,557 | 1/1974 | Pielkenrood....................... | 210/521 |
| 3,788,981 | 1/1974 | Richard et al. .................... | 210/521 |
| 3,833,122 | 9/1974 | Cook .................................. | 210/242 |

*Primary Examiner*—Theodore A. Granger
*Attorney, Agent, or Firm*—Fleit & Jacobson

[57] ABSTRACT

Floating device to remove refuse situated on and under a water surface, comprising a first and a second floating body and a hose-type duct with which the two floating bodies can be connected together via connecting openings, a water inlet feature and a mixing feature to mix the polluted water with a flocculation agent being installed on the first floating body and the hose-type duct forming a resting zone to calm the water and flocculate the refuse in the water and a feature to remove the flocculated sludge from the water being arranged on the second floating body.

10 Claims, 2 Drawing Figures

U.S. Patent  Oct. 26, 1976  3,988,241

FLOATING DEVICE FOR REMOVING REFUSE SITUATED ON AND UNDER A WATER SURFACE

This is a continuation application of U.S. Ser. No. 404,908, filed Oct. 10, 1973, now abandoned.

This invention relates to a floating device for removing refuse situated on and under a water surface, comprising a water inlet feature, a mixing feature for mixing the polluted water with a flocculation agent, a resting or rentention zone to calm the water and flocculate the refuse and a feature to remove the flocculated sludge from the water.

In a device of this kind the refuse which is floating on or under the surface of the water is peeled off or sucked off and the dirty water is mixed with a chemical flocculation agent and introduced into a resting zone where the refuse is flocculated. The flocculated sludge is then separated from the water so that cleaned water is obtained.

Difficulties are encountered still in designing the resting zone in such a manner that the reaction time for flocculation is adequate. For example the task of processing one cubic meter of polluted water per second at a flow speed of 1 meter per second and a resting time of 6 minutes necessitates a resting zone of 360 meters. An extremely large ship's length would be required even if the resting zone had a meander-shaped arrangement.

The object of this invention is therefore to design the floating device named at the beginning in such a manner that the ship's body required for this purpose can be relatively short, the required resting time nevertheless being achieved in the resting zone.

With the floating device represented at the beginning this object is achieved in accordance with the invention in that the water inlet feature and the mixing feature are installed on a first floating body, in that the feature for removing the flocculated sludge from the water is arranged in a second floating body and in that the resting zone is designed in the form of a hose-type duct which connects the two floating bodies together via connecting openings. The floating device is accordingly designed in such a way that it is divided into three parts, the polluted water being mixed with the flocculation agent in the first part of the floating device, i.e. in the first floating body, the refuse being flocculated in the second part, i.e. in the resting zone designed as a hose-type duct, and the flocculated sludge being removed from the water and the water thus being finally cleaned in a third part, i.e. in the second floating body.

The hose-type duct is long enough for the resting time. As said hose-type duct can be folded up or rolled up, it can be deposited on one of the two floating bodies when the task of cleaning the water has been completed. The two floating bodies can thus be limited to such a length as enables the features provided on them to be accommodated. After the hose has been deposited on one of the two floating bodies, both floating bodies can also be coupled together so that they form a single ship's body. It is advantageous when the hose-type duct consists of plastics so that it can be rolled up or folded up.

In order to be able to pull the hose-type duct in onto one of the two floating bodies, a folding feature designed to fold and store the hose-type duct is provided on one of the two floating bodies. The folding feature contains an outrigger which goes under the duct and is so hinged onto one of the two floating bodies that when the outrigger describes swivelling motions certain partial lengths of the duct can be stacked up on one of the two floating bodies.

The folding feature furthermore exhibits one or two racks into which horizontally arranged bars can be inserted which hold the stacked or folded duct parts at the folding points.

The water inlet opening can be closed upon completion of the cleaning operation. Similarly, the connecting openings on the first and second floating bodies can be closed when the hose-type duct has been removed.

When being used, the hose-type duct can be suspended from floats. For the purpose of laying out the hose-type duct one or two cables can be put up between the first and second floating bodies. When the distance between the two floating bodies is increased, said cables unwind via a winch, allowing the hose-type duct to drop into the water.

The feature for removing the flocculated sludge may be so designed that the flow rate of the water containing the flocculated sludge is lower than the sinking speed of the flocculated sludge. The sludge that has sunk can be removed with the aid of a suction pipe. For this purpose the flow of water emerging from the hose-type duct can be divided into several partial flows of low speed. Several ducts rising in the direction of flow of the water can be provided to this end, the suction pipe for the flocculated sludge that has settled being provided at the duct inlet openings. The speed can be reduced by making the total area of the cross sections of all inlet openings of the ducts smaller than the cross-sectional area of the hose-type duct.

A draining feature for the sludge that is sucked off can be provided on the second floating body in addition to the feature for removing the flocculated sludge from the water.

The floating device may also be designed in such a manner that at least the first floating body can be anchored down.

The performance of the device according to the invention is very great and 5 cubic meters and more of water can be treated per second.

Figure 2:
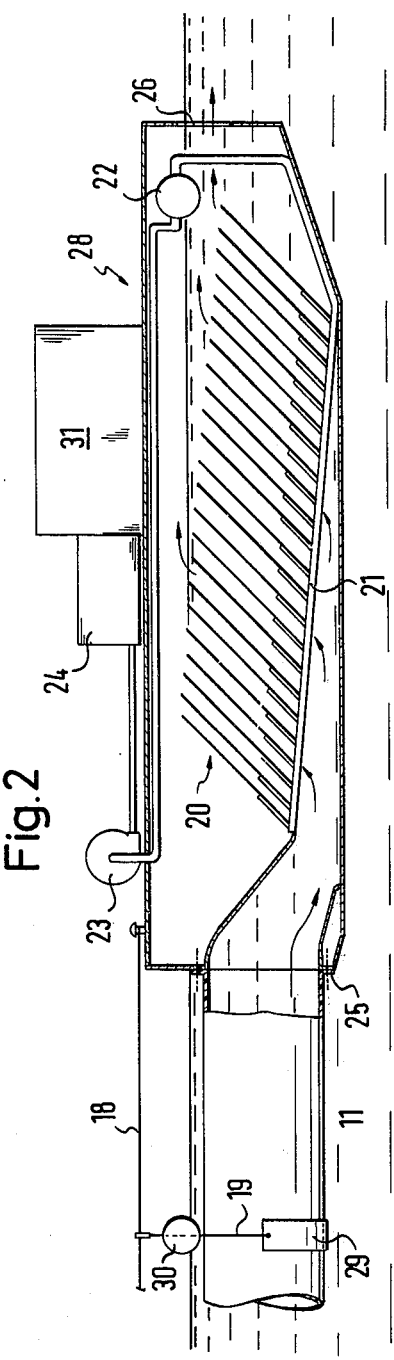

The invention is explained in greater detail below with reference to the attached drawings:

FIG. 1 shows a first floating body with a chopped-off partial section of a hose-type duct; and FIG. 2 shows a second floating body with a chopped-off part of the hose-type duct.

A mixing feature having a mixing chamber 2 designed in the form of a duct is provided in a first floating body 1 (FIG. 1). The flocculation agent is mixed with the polluted water in said mixing chamber 2. The dirty water for processing is introduced into mixing chamber 2 by means of a pump 3. A supply tank 4 contains a stock of the flocculation agent. Appropriate amounts of the flocculation agent are introduced into a mixing tank 6 for the passage of dirty water in mixing chamber 2 by a motor 5 which drives an appropriate conveying means, a screw for example. In addition, dissolving watr is conveyed into mixing tank 6 by means of a pump 7. The dissolved flocculation agent is added to the intaken dirty water by means of a dosing pump 8 via a tubular ring 9 furnished with spraying nozzles. Dosing pump 8 and the conveying screw with which the flocculation agent is introduced into mixing tank 6 are controlled as a function of the passage of dirty water in mixing chamber 2. Pump 7 which introduces the dissolving water into mixing tank 6 is controlled by means of water-level measurement in mixing tank 6. Means of producing great turbulence are mounted on the walls of mixing chamber 2, in the form of fins for example.

The resting zone takes the form of a hose-type duct 11, advantageously consisting of plastics. Said hose-type duct is connected to the first floating body via a flange 10 which surrounds the connecting opening at the stern of the first floating body. A connection is thus established between mixing chamber 2 and the interior of hose-type duct 11. The connecting means, for example joining screws or wedge bolts, can be handled from the interior of the first floating body 1 so that the joint can be released or fastened under water, too.

At the stern of floating body 1 there is an outrigger 12 which takes the form of a two-arm lever. The two levers of outrigger 12 are joined together by means of a roller 27. Outrigger 12 grips under hose-type duct 11 with the aid of roller 27. Outrigger 12 serves to pull the hose in. One hose part after another is raised, emptied and drawn onto deck by the mechanical or hydraulic swivelling of the two levers of outrigger 12. The hose is then folded there. The folding operation is made easier by the presence of two racks 13 and 14. Bars which assume a horizontal position can be pushed through said racks. The hose-type duct is folded around said bars. The various folded layers are also fixed and secured by the bars so that there is no possibility of displacement when further duct parts are hauled in. The bars can be removed when the duct has been stacked up, after a few layers in particular. This allows the stack height to be reduced.

The inlet opening for the dirty water at the bow of floating body 1 can be equipped with a rake 15 which is cleaned by means of scraping. The rake can be replaced by a closure plate so that mixing chamber 2 can be closed up. Similarly, the connecting opening at the stern, which is surrounded by flange 10, can be closed up by a closure plate upon removal of the pipe. Mixing chamber 2 can be emptied via a bilge pump 16.

Floating body 1 and a second floating body 28, which is shown in FIG. 2, can be connected together by cables 18. Cables 18 are wound around capstans 17 here. When cables 18 are being unwound and duct 11 is being laid out, further connecting cables 19 can be provided at certain intervals; said cables 19 carry belt-shaped parts 29 to support hose-type duct 11. In addition, floats 30 can also be provided which compensate for the weight of the hose and cables. Floats 30 are likewise suspended from the connecting cables and are deposited on the surface of the water when hose-type duct 11 is being laid out. Before cables 18 are unwound, hose-type duct 11 is fastened to a flange 25 of floating body 28 as shown in FIG. 2.

In the interior of floating body 28 in FIG. 2 there is the feature for removing the flocculated sludge from the dirty water. Said feature may consist of a conventional filter of very large area or of a plate separator which causes the flow rate to drop below the sinking speed of the flakes. The flow of liquid emerging from hose-type duct 11 is divided into a large number of partial flows of low speed. The reduction in speed corresponds to the aspect ratio of the cross-sectional area of the hose-type duct to the inflow area of plate separator 20. Said ratio amounts to about 1 : 10. The cleaned water flows through a duct 26 — after it has left plate separator 20 — and out of the second floating body 28.

Plate separator 20 consists of several parallel plates forming ducts which rise in the direction of flow of the water. The settled sludge accumulating at the entrances of the ducts is conveyed by a sludge suction pipe 21 via a pump 22 into a sludge separator 23. Said sludge separator 23 can be designed as a centrifuge or as some other type of feature for separating a dry matter from water. The dried sludge obtained can be put into a bunker, pumped to an auxiliary vessel or burnt via preliminary driers 24 in a sludge incinerating plant 31 on board, the volume of the sludge thus being reduced substantially.

The whole device is moved into the working position by anchoring down the first floating body in FIG. 1 and by utilising the resistance of the second floating body in FIG. 2. If the water for cleaning does not flow fast enough, the floating body in FIG. 2 is also anchored down and moved to a fixed position where cables 18 are taut. Drive units not shown here and taking the form of diesel engines can be provided on both floating bodies. Said units may serve both to propel the device and to supply power to the features arranged on them.

I claim:

1. In combination with a body of water apparatus for purification of said body of water, said apparatus comprising a first floatable chamber constructed and arranged to be located at least partially beneath the surface of said body of water, inlet means located at a first end of said chamber and fluid pump means supported by said floatable chamber for introducing liquid with solid particles suspended therein from said body of water into said first chamber through said inlet, chemical flocculation means supported by said first chamber for introducing chemical flocculation agents into said first chamber, mixing means located in said first chamber for mixing chemical flocculation agents with the liquid in said chamber, elongate flexible duct means with a first end connected to an outlet in said chamber spaced apart from said inlet means, said flexible duct means being constructed and arranged to be of such a length for providing a residence zone for liquid introduced into said duct from said first chamber, a second inlet end of said duct connected to a second floatable chamber with a first end, said chamber being constructed and arranged to be located at least partially beneath the surface of said body of water, parallel plate separators located within said second chamber, outlet means located in a second end of said second chamber spaced apart from said inlet end whereby liquid introduced into said first chamber from the body of water by said pump means is returned to the body of water.

2. The floating device of claim 1 wherein a folding means is mounted on one of said first and second floatable chambers for folding and supporting said flexible duct, said folding means comprising an articulated arm which is adapted to engage the bottom of said flexible duct.

3. The floating device of claim 2 wherein said folding means further comprises a plurality of frames mounted on said one of said first and second floatable chambers each having means for inserting and fixing horizontal rods.

4. The floating device of claim 1 wherein said first and second floatable chambers each include means for sealing said liquid inlet and outlet means.

5. The floating device of claim 1 wherein winch means are mounted on said first and second floatable chambers, a cable is stretched between said winch means and adapted to be paid in and out as the distance between said first and second floatable chambers decreases and increases, respectively, and a float is attached to said cable and to said flexible duct to support the same.

6. The floating device of claim 1 wherein said parallel plate separators comprise plate divider means having a plurality of upwardly extending channels in the liquid flow direction and having suction pipe means positioned at the inlets of said channels for removing flocculated sludge.

7. The floating device of claim 1 wherein means for mixing chemical flocculation agents with liquid is mounted on said first floatable chamber.

8. The floating device of claim 1 wherein said flexible tubular duct is made of plastic.

9. The floating device of claim 1 wherein suction pipe means is mounted in said first chamber near said inlet means of said first floatable chamber to suck liquid into said first chamber.

10. The floating device of claim 1 and further comprising means for anchoring said first floatable chamber.

* * * * *